United States Patent [19]
Sorensen

[11] Patent Number: 5,741,049
[45] Date of Patent: *Apr. 21, 1998

[54] BRAKE PROPORTIONING VALVE

[75] Inventor: Ronald L. Sorensen, Erie, Mich.

[73] Assignee: Kelsey-Hayes Company, Romulus, Mich.

[*] Notice: The term of this patent shall not extend beyond the expiration date of Pat. No. 5,522,651.

[21] Appl. No.: 659,077

[22] Filed: Jun. 3, 1996

Related U.S. Application Data

[63] Continuation-in-part of Ser. No. 460,522, Jun. 2, 1995, Pat. No. 5,522,651.

[51] Int. Cl.$^6$ .................................................. B60T 8/26
[52] U.S. Cl. .................... 303/9.75; 303/113.5; 303/9.62; 188/349
[58] Field of Search ........................ 303/9.62, 9.75, 303/9.64, 9.65, 9.71, 9.72, 9.73, 9.74, 84.1, 84.2, 113.5, 900, 901; 137/505.25, 508, 505.13; 188/349

[56] References Cited

U.S. PATENT DOCUMENTS

| | | |
|---|---|---|
| 3,311,422 | 3/1967 | Oberthur . |
| 3,354,638 | 11/1967 | Kersting . |
| 3,525,552 | 8/1970 | Oberthür ............................ 303/9.75 |
| 3,680,922 | 8/1972 | Kawai . |
| 3,695,730 | 10/1972 | Ayers, Jr. . |
| 3,969,000 | 7/1976 | Ohta et al. ............................ 303/9.75 |
| 4,008,925 | 2/1977 | Young . |
| 4,027,923 | 6/1977 | Saito ............................ 303/9.71 |
| 4,664,451 | 5/1987 | Sakaguchi et al. . |
| 4,828,335 | 5/1989 | Fuller et al. . |
| 4,982,999 | 1/1991 | Rossigno et al. . |
| 5,066,072 | 11/1991 | Yanagi et al. ............................ 303/9.75 |
| 5,320,423 | 6/1994 | Hashida . |
| 5,522,651 | 6/1996 | Sorensen . |

FOREIGN PATENT DOCUMENTS

| | | | |
|---|---|---|---|
| 0280506 | 7/1990 | Germany ............................ | 303/9.75 |
| 2310154 | 12/1990 | Japan ............................ | 303/9.75 |

*Primary Examiner*—Douglas C. Butler
*Attorney, Agent, or Firm*—McMillan, Sobanski & Todd, LLC

[57] ABSTRACT

A brake proportioning valve displaying low restriction to fluid flow and short fluid shear path is suitable for use in vehicular traction control systems and capable of supplying a high volume of fluid to the traction control system high pressure pump under atmospheric pressure. The proportioning valve employs a plunger of two diameters against which hydraulic pressure operates, and a plunger-located check ball held off its seat under low outlet pressure conditions by a control member. The brake proportioning valve provides proportioning of brake fluid pressure to the vehicle non-proportioned brakes relative to the vehicle proportioned brakes during both brake apply and brake release.

9 Claims, 6 Drawing Sheets

BRAKE PROPORTIONING VALVE

CROSS-REFERENCE TO RELATED APPLICATION

This is a continuation-in-part of application Ser. No. 08/460,522, filed Jun. 2, 1995, now U.S. Pat. No. 5,522,651.

TECHNICAL FIELD

The present invention pertains to brake proportioning valves. More particularly, the present invention pertains to brake proportioning valves suitable for use in vehicular traction control systems.

BACKGROUND ART

Like anti-lock braking systems (ABS) before them, traction control systems are becoming increasingly common in vehicles such as trucks, vans, and automobiles. In ABS, wheel lock-up caused by over-application of the brake pedal or the encountering of a road surface with less than optimal traction during braking is sensed by the ABS sensing elements. The circuitry associated with these sensing elements closes the normally open isolation valve located between the master cylinder and brake slave cylinder and at the same time, activates the high pressure ABS pump and opens the normally closed hold/dump valves. To release the brakes, the high pressure in the brake slave cylinder initially dumps into the low pressure accumulator. However, if the accumulator becomes filled with fluid, the slave cylinder fluid will no longer have an escape path. Therefore, the high pressure pump pumps fluid from the accumulator back to the master cylinder reservoir. The brakes thus momentarily release, restoring wheel rotation. In a closed ABS system, the hold/dump valve is then closed and high pressure fluid from the pump reengages the brakes. This cycle repeats itself as long as brake pedal pressure is applied and wheel lock or incipient wheel lock is detected.

In a traction control system (TCS), the sensing elements activate traction control (TC) when wheel spin is sensed. The TCS momentarily applies pressurized brake fluid to the brake slave cylinders, slowing wheel rotation, and restoring traction. Like ABS, the brakes may rapidly cycle between brake apply and release cycles, however in TCS, the cycling continues until the sensing elements no longer detect wheel spin rather than wheel lock. Unlike ABS, however, where a pressurized supply of brake fluid from the master cylinder already exists by virtue of application of the brake pedal, in TCS, the pressure must be supplied by the high pressure pump or, early on in the cycle, from a high pressure accumulator as the brake pedal is normally not active during acceleration.

In braking systems where the front and rear brake pressure is not proportioned, a low resistance flow path already exists between the master cylinder and the high pressure pump. However, in many vehicles, it is necessary to supply proportionately less pressure to the front wheel slave cylinders or rear wheel slave cylinders, generally the latter, and for this purpose it is necessary to include a brake fluid pressure proportioning valve in the master cylinder line when used with TCS. This would be an example of a vertically split system where the front and rear brakes are supplied brake fluid from a respective separate line, pressure chamber and reservoir of the master cylinder. The previously known proportioning valves present a flow restriction and this can momentarily deprive the pump of fluid particularly on systems without a high pressure accumulator.

Proportioning valves used in vehicular braking systems are designed such that both front and rear brake pressure increase in tandem up to the so-called "split-point". Above this pressure, the pressure associated with one set of brakes increases in step with the increase in master cylinder pressure, while the pressure associated with the second set of brakes increases at a diminished rate. This situation is reflected by FIG. 1a. In portion (A) of the plot in FIG. 1a, the pressure of both front and rear brakes (output pressure) increases uniformly, in step with the master cylinder pressure (input pressure). Above the split point (B), however, while the non-proportioned (e.g. front) brake pressure (C) continues to increase in direct proportion to the master cylinder pressure, the proportioned (e.g. rear) brake pressure (D) increases at a reduced rate.

A brake proportioning valve of the prior art is illustrated in FIG. 2. The valve is normally open. The plunger 1 is held against the off stop 2 of valve seat 5 by the force of the spring 3. The valve seat includes a plurality of radially extending ribs 4 at the off stop, namely the face opposite plunger shoulder 13. During brake apply, the flow of fluid from the master cylinder through port 7, below the split point, is between the radial ribs on the face of the valve seat and the shoulder 13 on the plunger. It then passes through the inner diameter or bore of the valve seat (as measured at enlarged plunger portion 11) to the outlet port 19.

The operation of the proportioning valve is described by the formula: $P_oA = P_i(A-B) + F$, wherein $A$ = Cross sectional area of enlarged plunger portion 11

$B$ = Cross sectional area of plunger at rear pin portion $P_i$ = Inlet pressure at port 7

$P_o$ = Outlet pressure at port 19

$F$ = Force of spring 3.

When the hydraulic force acting on the plunger 1 exceeds the spring 3 force ($P_iB \geq F$), the plunger moves away from the off stop until it contacts the valve seat 5. This occurs at the valve split point. This condition is depicted in FIG. 2. Now the plunger has closed against the seat, and fluid pressure acts against the plunger differential area (A-B). This produces an opening force on the plunger, assisting the spring, and delivers a portion of this increased pressure to the proportioned brakes through outlet port 19.

However, this increased pressure to the proportioned brakes creates an opposing force on the plunger, over area B, as the lip seal portion 21 of valve seat 5 is constructed with flow through clearance permitting reverse flow past the seal lip, thereby tending to reclose the plunger against the seat. These opposing forces tend to keep the plunger closely adjacent to the seat for the restricted flow of fluid from the inlet to the outlet. This flow is equal to the ratio of the annular area i.e. the plunger differential area (A–B) to the total area A within the effective valve seat sealing circumference, i.e. reducing Ratio=A–B/A.

If the master cylinder is maintained at a constant pressure (above the split point), the plunger will remain closed, thereby keeping the proportioned brake pressure constant.

Devices similar to that shown in FIG. 2 are suitable for use in ABS, but are not optimal for TCS due to the limitations imposed on fluid flow. Moreover, the brake apply and brake release pressures curves are not similar. As shown in FIG. 1b, which represents the pressure in the brake apply and release modes, the output pressure during brake apply increases in step with the inlet pressure (A) up to the split point (B). Above the split point, the output pressure increases with input pressure, but at a different rate over the portion (C) of the plot, this rate determined by the differential areas A and B of the plunger as illustrated in FIG. 2. On brake release, however, the brake pressure is not instantaneously released, retracing the brake pressure apply curve, but rather, following an initial hysteresis due to O-ring seal friction (D), decreases slightly due to the limited volume compensation caused by the movement of the plunger away from the valve seat (E) toward the end stop, following which the pressure remains relatively constant (F) until the output pressure/input pressure differential is sufficient to force fluid around the periphery of the valve seat past the lip seal. At this point (G), the pressure again drops over area (H), and the plunger returns to its off stop against the valve seat when the spring force is greater than the hydraulic pressure (I). The result, which to a certain extent is dependent on ambient conditions, can be an extended period where the brakes may remain engaged despite master cylinder pressure having been released. The pressures during the brake apply and brake release cycles are not symmetrical, and designed proportioning is achieved only during the brake apply cycle.

It would be desirable to provide a proportioning valve which offers virtually unrestricted flow for use in TCS, and which provides a short shear path for fluid such that flow at low temperatures is maintained. It is further desirable to provide a proportioning valve which minimizes lag in brake release by providing a brake release pressure curve which closely mirrors the brake apply pressure curve, thus providing proportioning during both brake apply and brake release cycles.

SUMMARY OF THE INVENTION

The present invention pertains to a brake proportioning valve suitable for use in TCS, which provides for hydraulic fluid at the TCS pump inlet. The present invention more particularly pertains to a proportioning valve which provides low flow restriction and a short shear path for hydraulic fluid, and which further provides a brake release pressure cycle which closely mirrors the brake apply cycle. The brake proportioning valve of the present invention employs a movable piston element containing a ball check valve which, during low pressure flow, is held away from its seat by a protruding pin located on a member other than the plunger per se. The large passageway in the check ball seat provides a short shear path for fluid while at the same time allowing for large fluid flow volume. The displacement of the plunger provides for total volume compensation for the brake slave cylinder retraction, enabling the brake release pressure cycle to closely approximate the brake apply pressure cycle.

BEST MODE FOR CARRYING OUT THE INVENTION

Figure 3:
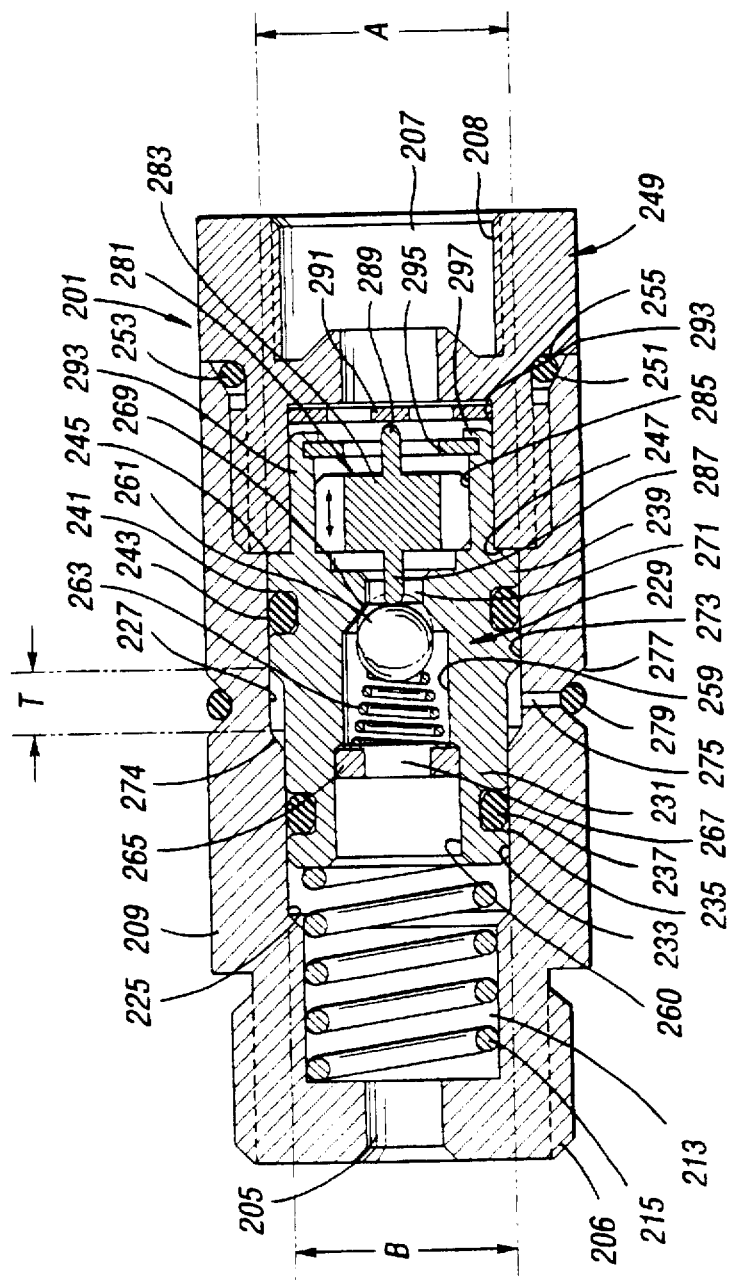
FIG. 3 is an elevation view in cross-section illustrating a first embodiment of a brake proportioning device in accordance with the present invention.

The construction and operation of the brake proportioning valve of the subject invention may be best understood by reference to one embodiment as presented in FIG. 3. The subject brake proportioning valve may be designed as a stand-alone component which may be connected via standard hydraulic fittings to the master cylinder, to the master cylinder line, or to the hydraulic control unit (HCU) of the TCS or combined TCS/ABS.

Figure 6:
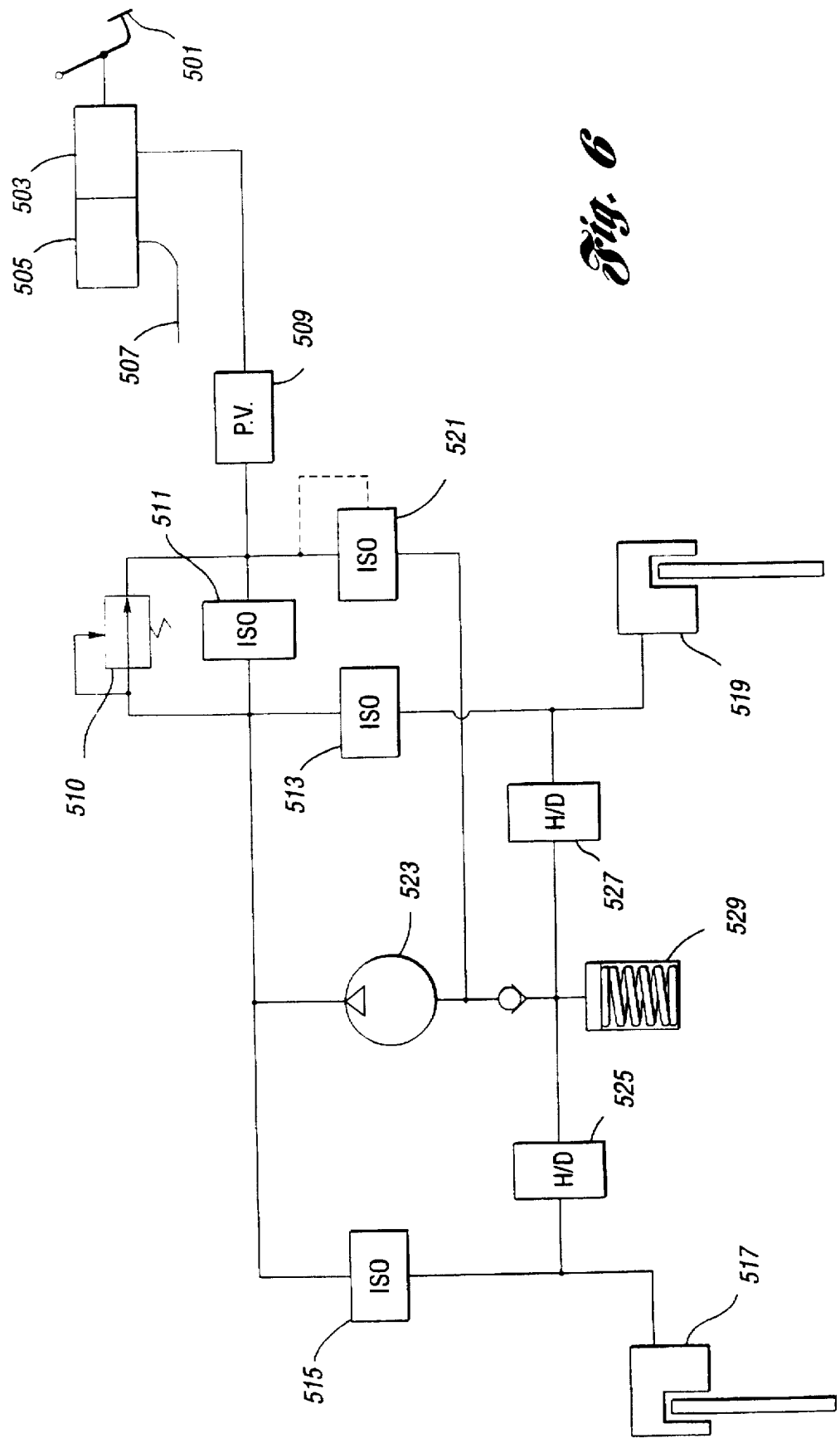
FIG. 6 is a schematic illustration of an ABS/TC system for a rear wheel drive vehicle showing an application for the proportioning valve of the present invention.

As shown in FIGS. 3 and 6, the device is constructed as a cartridge to be secured in the master cylinder line.

Figure 4:
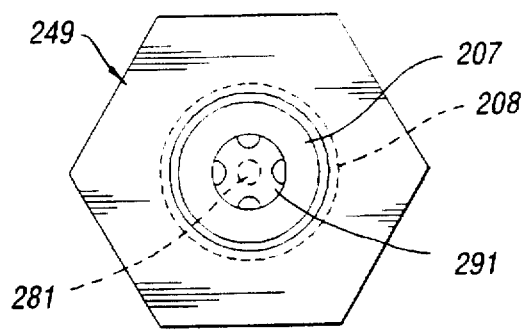
FIG. 4 is an end view of the device of of FIG. 4.

As shown in FIGS. 3 and 4, the brake proportioning valve 201 includes an inlet 205 from the master cylinder and an outlet 207 to the proportioned brakes and TCS or TCS/ABS components. The inlet 205 includes an externally threaded nut 206, and the outlet 207 includes an internally threaded bore 208.

The brake proportioning valve sleeve 209 is bored to contain at least two bores of different diameters, which define the pressure differential which produces the proportioning of brake pressure. The diameter of the first bore 225 located on the inlet side of the sleeve 209 has a diameter less than the second bore 227. Located within the sleeve 209 is a slidable plunger 229 which is constructed to have at least two portions of different diameters such that the plunger is a sliding fit within both the first and second bores of the sleeve. The inlet land portion 231 of the plunger has a diameter defined by surface 233 dimensioned to provide a sliding fit in bore 225, and further contains an annular groove 235 adapted to retain a pressure seal, preferably an elastomeric O-ring seal 237. The outlet land portion 239 of the plunger is of a diameter larger than the inlet portion and dimensioned to provide a sliding fit in bore 227, and further contains annular groove 241 adapted to retain a pressure seal, preferably an elastomeric O-ring 243. The outlet face 245 of plunger 229 bears against a stop on the outlet side of sleeve 209, namely the radial surface 247 of hexagonally headed retainer nut 249 which is threadedly secured within sleeve 209. At 251 is an elastomeric sealing O-ring trapped between the angled outlet face 253 of sleeve 209 and shoulder 255 of retainer 249. The outlet passage 207 of retainer 249 is internally threaded within bore 208 to receive a hydraulic fitting or hydraulic line.

If the proportioning valve is designed to be installed within the HCU, outlet passage 207 would be untreaded, reduced in diameter and aligned with an internal bore of the HCU. Likewise, the inlet 205 would eliminate threads 206 in favor of securing the cartridge with a snap ring as shown in U.S. Pat. No. 5,364,067, assigned to the assignee of the present invention and incorporated herein by reference.

The interior of plunger 229 communicates at its inlet end with inlet reservoir 213 and contains a bore 259 adapted to receive check ball 261 biased by check ball spring 263 against check ball seat 269. Check ball spring 263 bears against perforated disk 265, press fitted as shown, or otherwise secured in bore 260. Disk 265 contains a passageway 267 to allow communication with inlet reservoir 213. The check ball seat 269 is bored to receive large diameter fluid passage 271. The length of the smaller diameter inlet portion 231 of plunger 229 up to the step 273 of larger diameter outlet portion 239 is chosen so as to provide plunger travel T.

Travel of plunger 229 toward the inlet side of the device over distance T will create an enlarged outlet fluid reservoir between end 247 of outlet portion 239 of plunger 229 and retainer 249. The enlargement of the enlarged fluid reservoir is chosen to correspond with the fluid volume associated with the designed retraction of the brake wheel cylinders upon brake release. Sleeve 209 contains an air pressure relief passage 275 which is open to bore 227 and relieves air past elastomeric O-ring 279 held in annular groove 277, whenever the plunger 229 cycles toward stop shoulder 274, as described below.

Between plunger 229 and retainer 249 is located means for displacing check ball 261 from check ball seat 269. In the embodiment of FIG. 3, this means is comprised of valve lifter 281 which includes valve lifter body 283 having an outer diameter adapted to slide in bore 285 in plunger 229. The outer circumference of valve lifter body 283 may be slotted or toothed (as shown) to provide passage(s) for fluid flow from the large diameter fluid passage 271 to outlet passage 207, or alternatively may have a smooth cylindrical outer surface and have one or a plurality of bores parallel to the cylindrical axis to provide for fluid flow. Extending axially from valve lifter body 283 toward the inlet end of the device is a control pin 287 which serves to lift check ball 261 off its seat when the position of the outlet end 245 of plunger 229 is proximate the retainer. Valve lifter body 283 is prevented from moving away toward the outlet end of the device by positioning pin 289 which bears against fixed perforated disk 291 located between plunger 229 and the end of the bore 293 in retainer 249. Valve lifter 281 contains both control pin 287 and insert positioning pin 289 which are symmetrical with respect to valve lifter body 283 for ease of assembly. Valve lifter 281 may be secured to plunger 229 by crimping over an axial extension 293 of plunger 229, or as shown, by retaining washer 295 which may be retained by crimping, shown at 297, or by other equivalent means.

Alternatively, control pin 287 could be made part of retainer 249, thereby eliminating the valve 281, washer 295, and disk 291 as separate components.

Figure 5A:
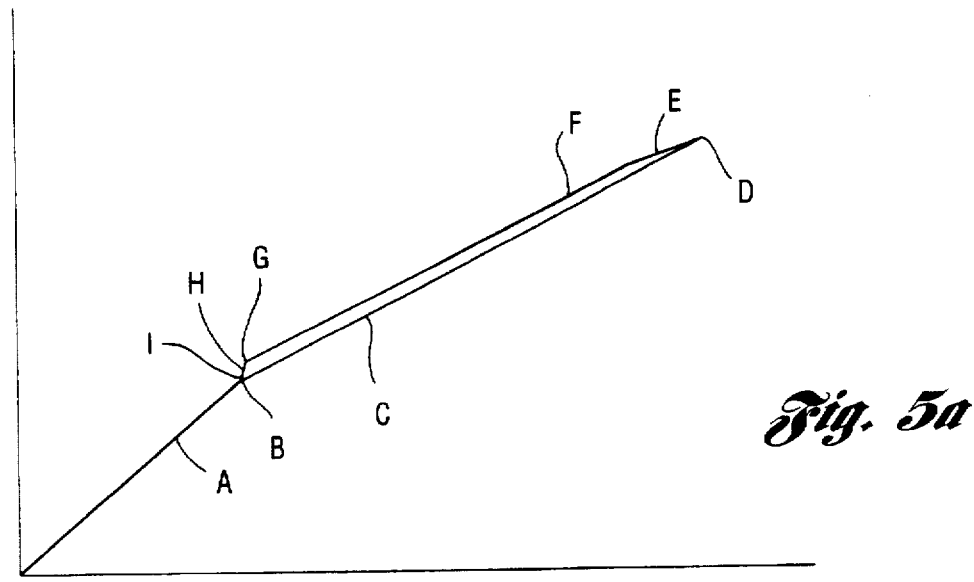
FIG. 5a illustrates schematically the inlet pressure versus outlet pressure for the brake proportioning device of FIG. 3 during brake apply and release.

In operation, with reference to FIGS. 3 and 5a, tensioning spring 215 forces plunger 229 outward toward the outlet side of the device until the plunger abuts its stop, namely inlet end 247 of retainer 249. The positioning pin 289 of control valve lifter 281 abuts perforated disk 291 and is thus prevented from traveling further toward the outlet end of the device. The length of positioning pin 289 and control pin 287 are such that check ball 261 is lifted off its seat by a predetermined distance calculated to provide adequate fluid flow at atmospheric pressure, preferably about 0.025 inches (0.064 cm). This degree of lift, in conjunction with the large diameter bore 271, provides sufficient volume for the high pressure pump in the TCS equivalent, for example, to an unrestricted bore of 0.074 inches (0.19 cm) diameter, thereby completely avoiding a starved condition.

During normal braking, pressurized fluid from the master cylinder enters the device 201 through inlet passage 205 or its equivalent, as discussed previously. The pressurized fluid flows from the inlet reservoir 213 through the internal plunger bore, past the check valve 261 which is held open by control pin 287, through large diameter bore 271, around or through positioning valve lifter 281, through retaining washer 295, and through perforated disk 291 to the outlet channel 207. The pressurized fluid from the master cylinder and inlet reservoir initially assists tensioning spring 215 in holding plunger 229 against its stop. Fluid flow is virtually unrestricted due to the relatively large diameter of bore 271 and the clearance between the check ball and its seat, as well as the minimum length shear flow path across the valve seat.

As the outlet pressure builds, it bears against enlarged outlet portion 239 of plunger 229, the cross-sectional area of which is larger than the cross-sectional area of reduced diameter inlet portion 231 of plunger 229, thereby creating a pressure differential. When the hydraulic force of this pressure differential exceeds the force exerted by tensioning spring 215, plunger 229 will travel toward the inlet side of device 201. During this travel, valve lifter 281 tends to move in concert, but the minimal opposing force of check ball spring 263 is sufficient to force valve lifter 281 outward in its bore 285 toward retaining disk 295 and force the check ball onto its seat. When the outlet pressure is sufficiently high to cause the valve lifter 281 to recede by the distance the check ball is normally held off its seat, the check ball will seat, and brake pressure will be maintained constant pending additional brake pedal pressure or brake pedal release.

Upon additional application of brake pedal pressure, the total pressure acting against the inlet side of the plunger 229 will force it momentarily outward, again causing control pin 287 to lift check ball 261 off its seat, allowing fluid flow and increased pressure at outlet 207. The increased outlet pressure, however, acting against larger cross-section of outlet portion 239 will again cause plunger 229 to travel toward the inlet, the check ball will again abut its seat, and a static condition will again be achieved. The outlet pressure under these conditions, above the split point, will be reduced from the inlet pressure by the cross-sectional A–B area differential.

Figure 1A:
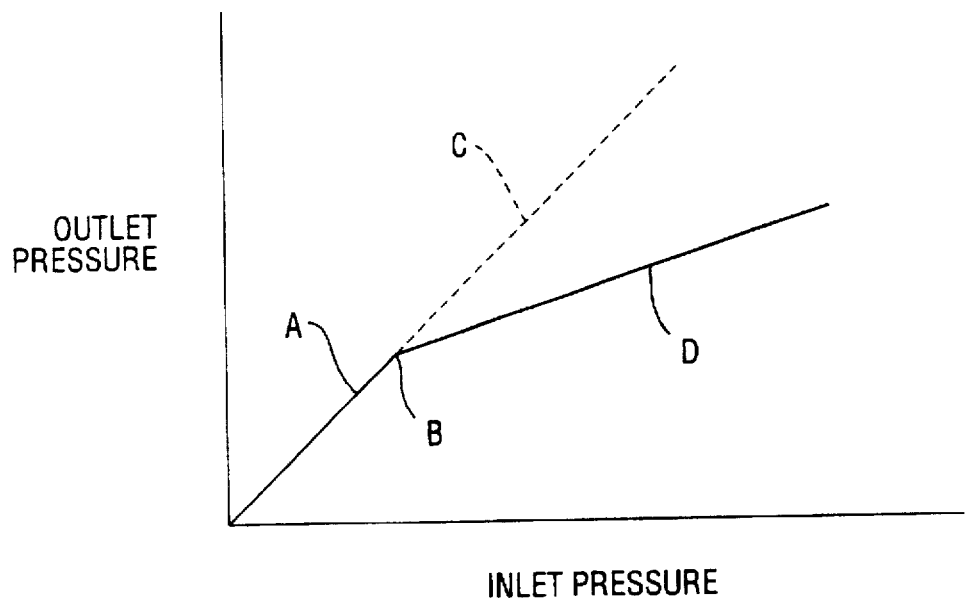
FIG. 1a is a general plot of inlet pressure versus outlet pressure for a typical brake proportioning valve during the brake apply cycle.

The operation thus far results in a brake pressure apply cycle similar to that of FIG. 1a and portions (A), (B) and (C) of FIG. 5a. The outlet pressure increases in step with the inlet pressure up to the split point (B), at which time the check valve first closes. The pressure defining the split point may be adjusted by altering the tension of tensioning spring 215 and by altering the differential cross-sectional areas of inlet and outlet portions 231, 239 of plunger 229.

When brake pedal pressure is released, the outlet pressure will be significantly higher than the inlet pressure, which is now essentially atmospheric. The tensioning spring 215 is no longer assisted by hydraulic pressure across the inlet side of the plunger, and the outlet side pressure, acting against enlarged diameter portion 239 of plunger 229 will cause the plunger to travel inward until shoulder 273 of the plunger abuts stop shoulder 274 of the sleeve. The distance of travel, T, multiplied by the differential cross-sectional area between the inlet and outlet sides of the plunger represents volume compensation which is sufficient to take up the volume of fluid from brake slave cylinder retraction. The outlet pressure then acts against the check ball, lifting the ball off its seat and lowering the outlet pressure. Plunger 229 now is urged by tensioning spring 215 outward to its stop 247, inlet and outlet pressures are equal, and control pin 287 once again lifts check ball 261 off its seat providing a low atmospheric flow restrictive passage.

Figure 1B:
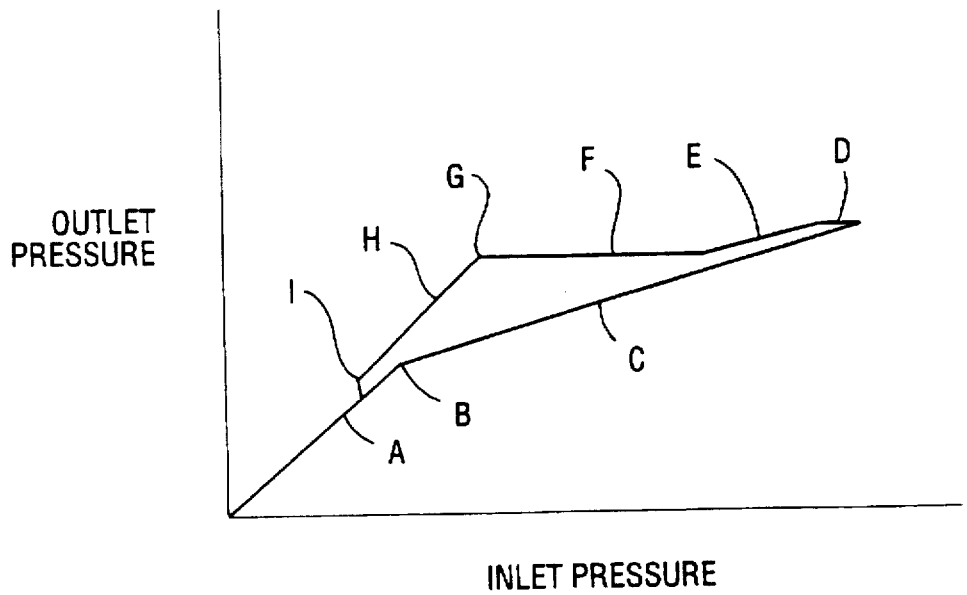
FIG. 1b is a plot of inlet pressure versus outlet pressure for a prior art brake proportioning valve for both the brake apply and brake release cycles.
Figure 2:
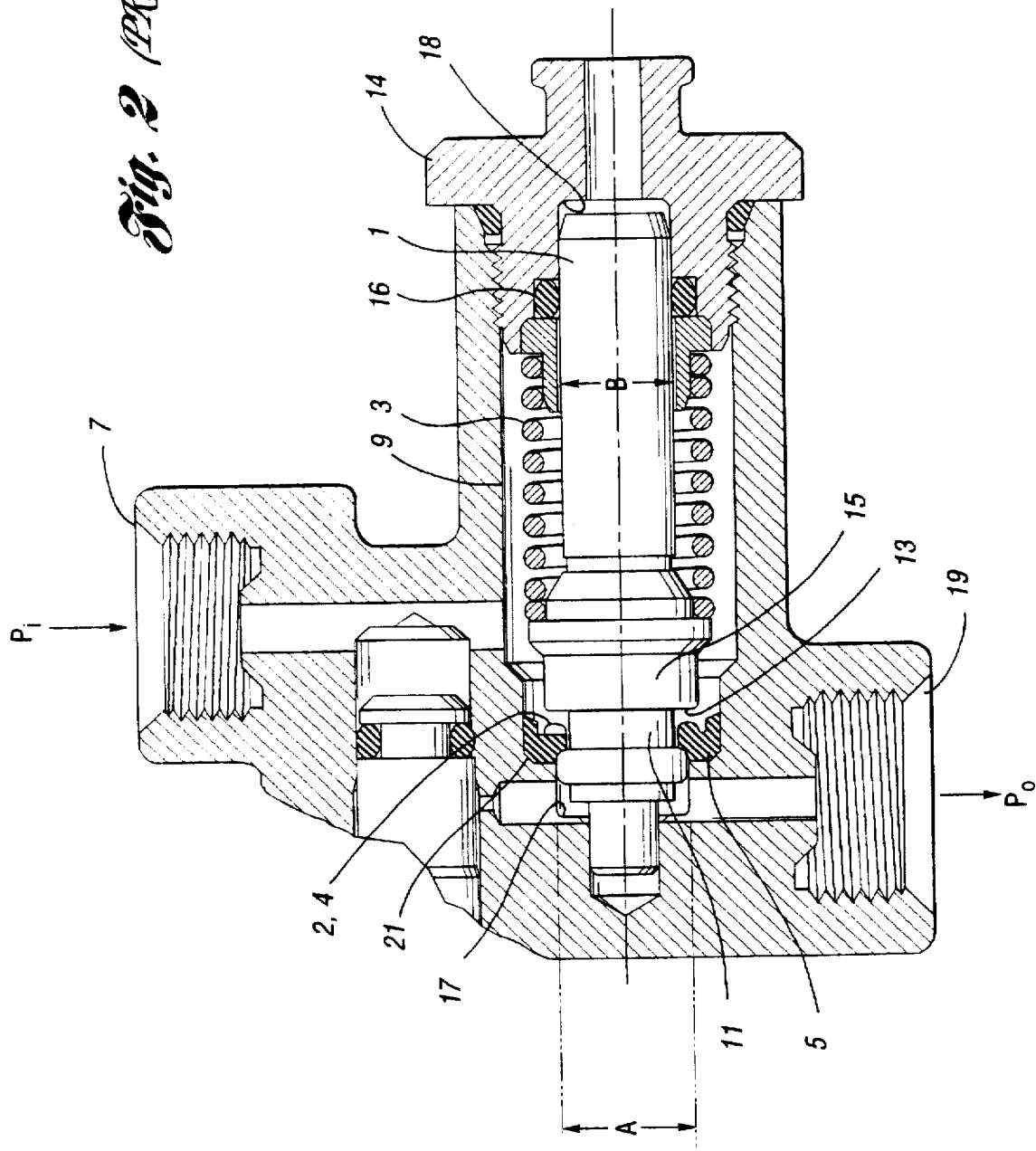
FIG. 2 is an elevation view in cross-section illustrating a prior art brake proportioning device.
Figure 5B:
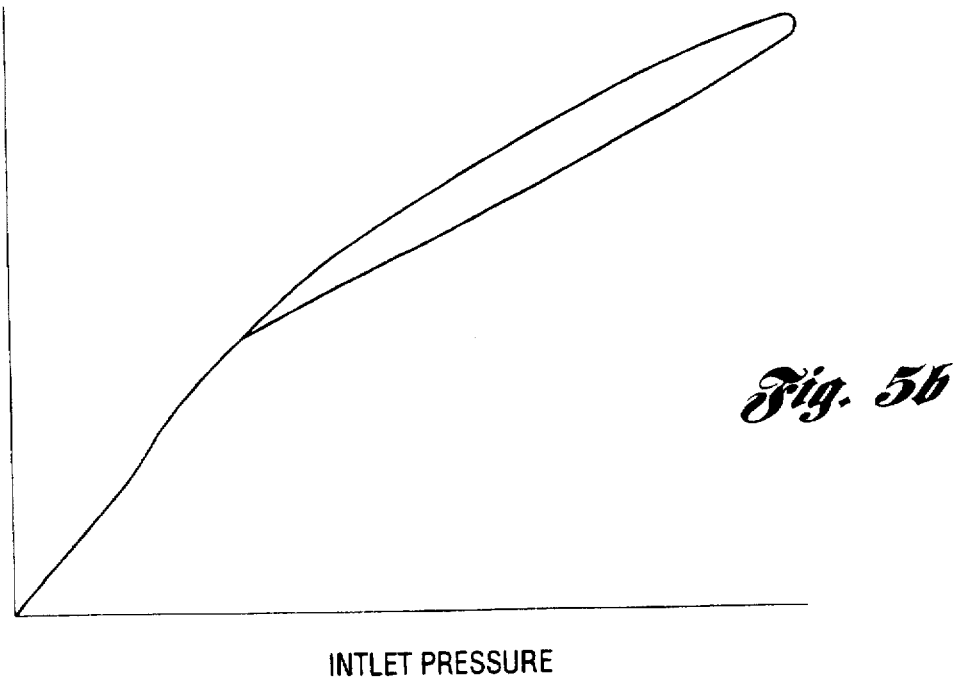
FIG. 5b is an actual test plot of inlet pressure versus outlet pressure of the device of FIG. 3 during brake apply and release.

With reference to FIG. 5a, upon release of inlet pressure or at the end of brake apply, the outlet pressure is at a maximum (D). A small degree of hysteresis due to elastomeric O-ring seals 237 and 243 is evident at (E). Over portion (F) of the inlet/outlet pressure curve, as brake release continues, plunger 229 is displaced over distance T by the force of the outlet pressure acting on Area A being greater than the force of the inlet pressure acting on Area B, resulting in volume compensation for the fluid flowing from the brake slave cylinders upon brake release. At (G), the pressure differential is such that the plunger has now been forced to its innermost position, and as the force due to the outlet pressure is still higher than the force due to the inlet pressure, fluid now travels past the check ball over slope (H) and the plunger, urged outward by the tensioning spring 215, again approaches its stop. At (I), the check ball is lifted off its seat by control pin 287 and the inlet and outlet pressure again are in step at split point (B). While in FIG. 5a, the inlet/outlet pressure curve is schematic, an actual test curve is shown in FIG. 5b. It will be noted the slope on brake release nearly matches that of brake apply and that there exists no apparent or noticeable transition phase (G) as present in prior art designs represented in FIG. 1(b), namely those requiring reverse flow past the lip seal/valve arrangement of FIG. 2.

The brake proportioning valve of the present invention may be constructed of conventional materials, for example machine-screw grade steel, ductile iron, and the like, as are conventional to those skilled in the art, to whom additional embodiments corresponding to the principles of operation described herein will be readily apparent. For example, the sleeve 209 may advantageously be the master cylinder or HCU body itself with appropriate bores therein. The term "cylindrical sleeve" refers to the internal arrangement of differential bores rather than a separate and distinct component in this respect. The dimensions may be adjusted as necessary to provide the differential cross-sectional areas for the desired proportioning ratio and for the volume compensation required (travel T). A suitable length of the device between the outlet face of the cartridge and the innermost travel position of the plunger may be 1.375 inches (3.5 cm), for example, with an exterior diameter of 0.95 inches (2.4 cm), and inlet portion/outlet portion plunger diameters of 1.25 and 1.125 inches (2.86 and 3.18 cm), respectively.

Having now described the construction and operation of the brake proportioning valve, its use in one embodiment of a TCS will be described with reference to FIG. 6.

In FIG. 6, an ABS/TC system for a rear wheel drive vehicle is illustrated in schematic form. The brake pedal 501 activates dual master cylinders 503 and 505, the latter supplying full master cylinder pressure to the front brakes through line 507. From master cylinder 503, during normal braking, pressurized brake fluid passes through low atmospheric restrictive flow proportioning valve 509 through normally open, solenoid activated isolation valve 511, and then through normally open isolation valves 513 and 515 to rear wheel brake slave cylinders 517 and 519. Fluid flow during brake apply cannot travel through normally open isolation valve 521 as the passage from this valve leads to the inlet of the high pressure pump 523, on the one side, and a one-way check valve on the other. During brake release, fluid flow is reversed.

During TC, no pressurized fluid flows from the master cylinder, but the sensing elements and associated circuitry, upon sensing wheel spin, close normally open isolation valve 511. Isolation valve 521 remains open and allows high volume hydraulic fluid flow from the master cylinder through proportioning valve 509, to the inlet of the high pressure pump 523. Pressurized fluid from the pump is prevented from flowing to the master cylinder by the now-closed isolation valve 511 and high pressure relief valve 510, and thus flows through still open isolation valves 513 and 515 to the brake slave cylinders 517 and 519. The brakes are momentarily applied until the sensing elements no longer detect wheel spin. At this time, hold/dump valves 525 and 527 may be opened to provide or ensure an initial charging of the low pressure accumulation 529, which on subsequent TC cycles is useful in charging the pump. Any excess fluid is returned to the master cylinder through high pressure relief valve 510.

At the end of the TC cycle, when wheel spin is no longer detected, the hold/dump valves are or remain closed, the pump is terminated, isolation valves 511, 515 and 521 are all open, and the operator has control of the brakes through pedal 501 for normal braking.

In the ABS mode, when wheel lock is detected, isolation valves 521, 513 and 515 are closed while hold/dump valves 525 and 527 are opened. Pressurized brake fluid flows from the slave cylinders through the respective hold/dump valves and into the low pressure accumulator 529. If necessary to empty the low pressure accumulator sufficiently to continue dumping the slave cylinder, the high pressure pump may be activated to draw fluid from the low pressure accumulator and pump it back to the master cylinder through open isolation valve 511 and proportioning valve 509. When the sensing circuitry no longer detects wheel lock, operation is returned to the normal braking circuit.

Many adaptations and variations of the low atmospheric restrictive flow proportioning valve and TCS/ABS circuitry will be evident to those skilled in TCS and ABS design.

Figure 7:
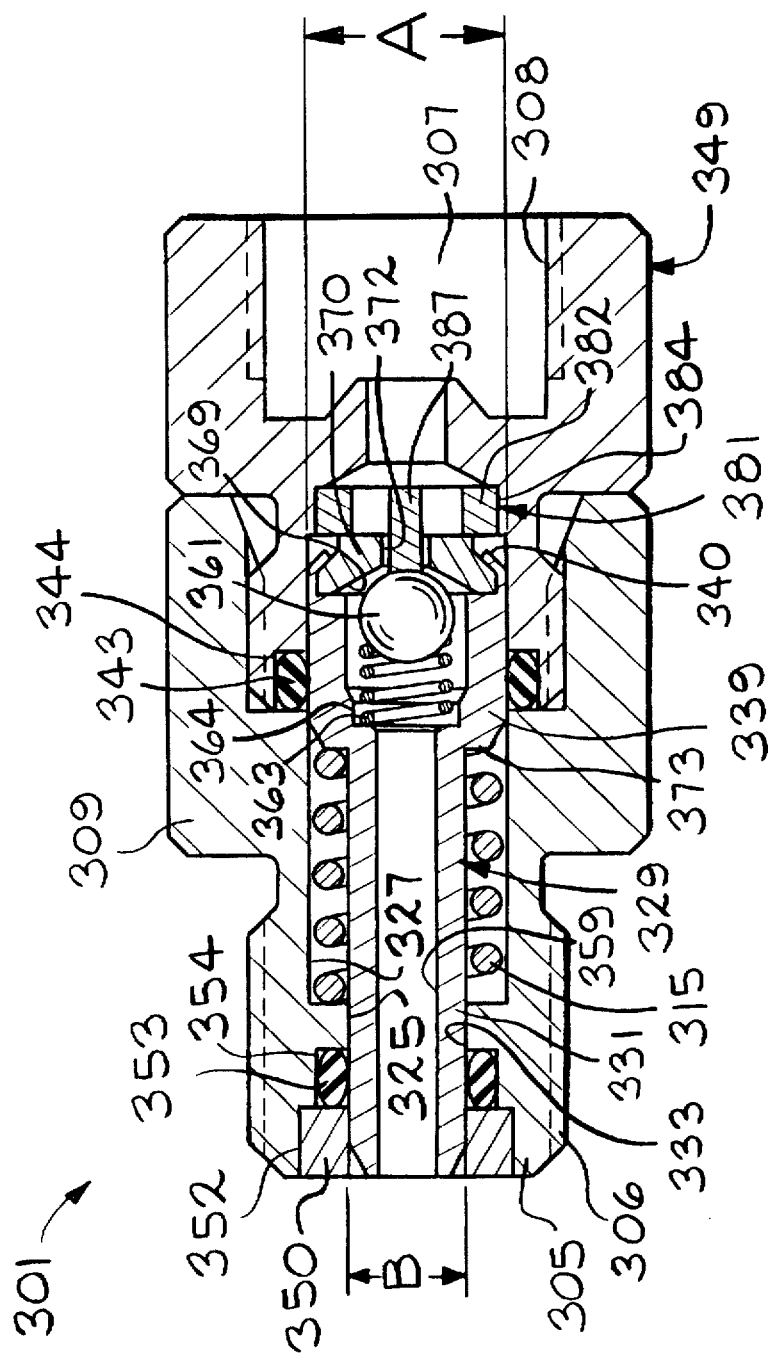
FIG. 7 is an elevation view in cross-section illustrating a second embodiment of a brake proportioning device in accordance with the present invention.

A second embodiment of a low atmospheric restrictive flow proportioning valve is indicated generally at 301 in FIG. 7. The brake proportioning valve 301 is constructed as a cartridge intended to be secured in the master cylinder line and includes a sleeve 309 having an inlet 305 from the master cylinder and an outlet 307 to the proportioned brakes or TCS or TCS/ABS components. The inlet 305 includes an externally threaded nut 306, and the outlet 307 includes an internally threaded bore 308. In other embodiments, internal threads can be formed at the inlet 305 and external threads can be provided at the outlet 307.

The sleeve 309 includes two bores of different diameters. The diameter of the first bore 325 located on the inlet side of the sleeve 309 has a diameter less than the second bore 327. Located within the sleeve 309 is a slidable plunger 329 which is constructed with two portions of different diameters corresponding to bores 325 and 327. The inlet land portion 331 of the plunger 329 has a diameter defined by surface 333 dimensioned to provide a sliding fit in bore 325. The outlet land portion 339 of the plunger 329 has a diameter greater than the inlet land portion 331 and is dimensioned to provide a sliding fit in bore 327.

A retainer nut 349, preferably formed with a hexagonal head, is threaded to the outlet end of the sleeve 309. A seal 343, preferably an elastomeric O-ring seal, is received in a recess 344 formed in the inlet end of the retainer nut 349 to provide a seal between the plunger 329 and the retainer nut 349. At the inlet end of the sleeve 309, a retainer 350 is secured to the sleeve 309 by a press or interference fit in a recess 352 formed about the bore 325. A seal 353, preferably an elastomeric O-ring seal, is received in a recess 354 formed about the bore 359 adjacent recess 352 to provide a seal between the plunger 329 and the sleeve 309.

The interior of plunger 329 contains a bore 359 adapted to receive check ball 361 biased by check ball spring 363 against check ball seat 369. Check ball spring 363 bears against a recess 364 formed about the bore 359. The check ball seat 369 is formed in a disc 370 having a large diameter fluid passageway 372 to permit fluid to flow through the bore 359 to the outlet 307. The disc 370 is secured to the outlet land portion 339 of the plunger 329 by crimping an end 340 of the plunger 329.

Between the plunger 339 and the retainer nut 349 is located means for displacing check ball 361 from check ball seat 369. A valve lifter 381 includes a body 382 press fitted into a recess 384 formed in the retainer nut 349 to secure the valve lifter 381 to the retainer nut 349. Extending axially from the body 382 is a control pin 387 which extends through passageway 372 to lift check ball 361 off its seat 369 when the plunger 329 and disc 370 are proximate the retainer nut 349. The body 382 includes slots to permit the passage of fluid to the outlet 307.

In operation, a tensioning spring 315 forces plunger 329 outward to the outlet side of the valve 301 until the disc 370 abuts the valve lifter 381 and the control pin 387 lifts the check ball 361 off of its valve seat 369, in a similar manner as described above for valve 201.

During normal braking, pressurized fluid enters valve 301 through the inlet 305 from the master cylinder. Pressurized fluid flows through the bore 359, past the check ball 361 which is held open by control pin 387, through passageway 372 and the valve lifter 381 to the outlet 307. Fluid flow is virtually unrestricted due to the relatively large diameter of passageway 372 and the clearance between the check ball 361 and its seat 369.

As outlet pressure builds, it bears against enlarged outlet portion 339 of plunger 329, the cross-sectional area of which is larger than the cross-sectional area of reduced diameter inlet portion 331 of the plunger 329, thereby creating a pressure differential. When the hydraulic force of this pressure differential exceeds the force exerted by tensioning spring 315, the plunger 329 will travel toward the inlet side of the valve 301. When the plunger 329 has receded the distance the check ball 361 is normally held off its valve seat 369, the check ball 361 will seat by the force of spring 363, and brake pressure will be maintained constant pending additional brake pedal pressure or brake pedal release.

Upon additional application of brake pedal pressure, the total pressure acting against the inlet side of the plunger 329 will force it momentarily outward, again causing control pin 387 to lift check ball 361 off its seat 369, allowing fluid flow and increased pressure at outlet 307. The increased outlet pressure, however, acting against larger cross-section of outlet portion 339 will again cause plunger 329 to travel toward the inlet 305, the check ball 361 will again abut its seat 369, and a static condition will again be achieved. The outlet pressure under these conditions, above the split point, will be reduced from the inlet pressure by the cross-sectional A–B area differential in a manner similar to the operation of valve 201.

When brake pedal pressure is released, the outlet pressure will be significantly higher than the inlet pressure, which is now essentially atmospheric. The tensioning spring 315 is no longer assisted by hydraulic pressure across the inlet side of the plunger 329, and the outlet side pressure, acting against enlarged diameter portion 339 of plunger 329 will cause the plunger 329 to travel inward until shoulder 373 of plunger 329 abuts the compressed solid height of the spring 315. The outlet pressure then acts against the check ball 361, lifting the ball 361 off its seat 369 and lowering the outlet pressure. Plunger 329 now is urged by tensioning spring 315 outward to until the disc 370 abuts the valve lifter 381 and control pin 387 once again lifts check ball 361 off its seat 369, providing a low atmospheric flow restrictive passage.

The brake proportioning valve 301 may be used in the ABS/TC system of FIG. 6. Depending upon fluid flow volumes, valve 301 can be substituted for proportioning valve 509. In other embodiments, valve 301 can be utilized in a diagonally split brake system and used upstream from a brake slave cylinder, for example between a hold/dump valve and a brake slave cylinder.

Having now fully described the invention, it will be apparent to one of ordinary skill in the art that many changes and modifications can be made thereto without departing from the spirit or scope of the invention as set forth herein.

What is claimed is:

1. A low atmospheric restrictive flow brake proportioning valve, comprising:

a sleeve having an inlet end and an outlet end, said sleeve having a bore of first diameter and a bore of second diameter, said bore of second diameter being larger in diameter than said bore of first diameter, said bore of first diameter located closer to said inlet end of said sleeve than said bore of second diameter;

a plunger having an inlet portion having a diameter providing a sliding fit within said bore of first diameter of said sleeve and an outlet portion having a diameter providing a sliding fit within said bore of second diameter, said inlet portion of said plunger terminating in an inlet end, said outlet portion of said plunger terminating in an outlet end, said plunger and said sleeve including stop means for allowing said plunger to travel a predetermined distance within said sleeve;

a through flow passage located within said plunger;

a check valve biased towards a closed position to block flow through said through flow passage;

said stop means including a first stop effective to limit the travel of said plunger in a direction toward said outlet end of said sleeve;

a check valve opening means effective to open said check valve when the position of the outlet end of said plunger is proximate said first stop;

a tensioning spring urging said plunger toward said first stop; and an outlet fluid reservoir defined by said bore of said second diameter of said sleeve, whereby the proportioning valve is (i) open to flow from a master cylinder at said inlet end, through said through flow passage, across said valve seat and out said outlet and at lower brake apply pressures; (ii) closed to flow across said valve seat at higher brake apply pressures creating a pressure differential across said plunger sufficient to overcome said tensioning spring, and (iii) rapidly reopened across said valve seat when the aforesaid pressure differential is reduced to the point that the force of the tensioning spring is no longer overcome.

2. The proportioning valve defined in claim 1 wherein the check valve opening means comprises a valve lifter.

3. The proportioning valve defined in claim 2 wherein the valve lifter includes a pin.

4. The proportioning valve defined in claim 3 wherein the valve lifter includes a slotted body to permit the passage of fluid.

5. The proportioning valve defined in claim 1 wherein the check valve is a check ball.

6. The proportioning valve defined in claim 5 including a ball seat for receiving the check ball when the check ball is urged toward a closed position.

7. The proportioning valve defined in claim 6 wherein the check valve opening means is a valve lifter.

8. The proportioning valve defined in claim 7 wherein the valve lifter includes a pin selectively extending through a passageway in the ball seat to urge the check ball away from the ball seat.

9. The proportioning valve defined in claim 8 wherein the valve lifter includes a body having slots to permit the passage of fluid.

* * * * *